United States Patent Office 3,255,399
Patented June 7, 1966

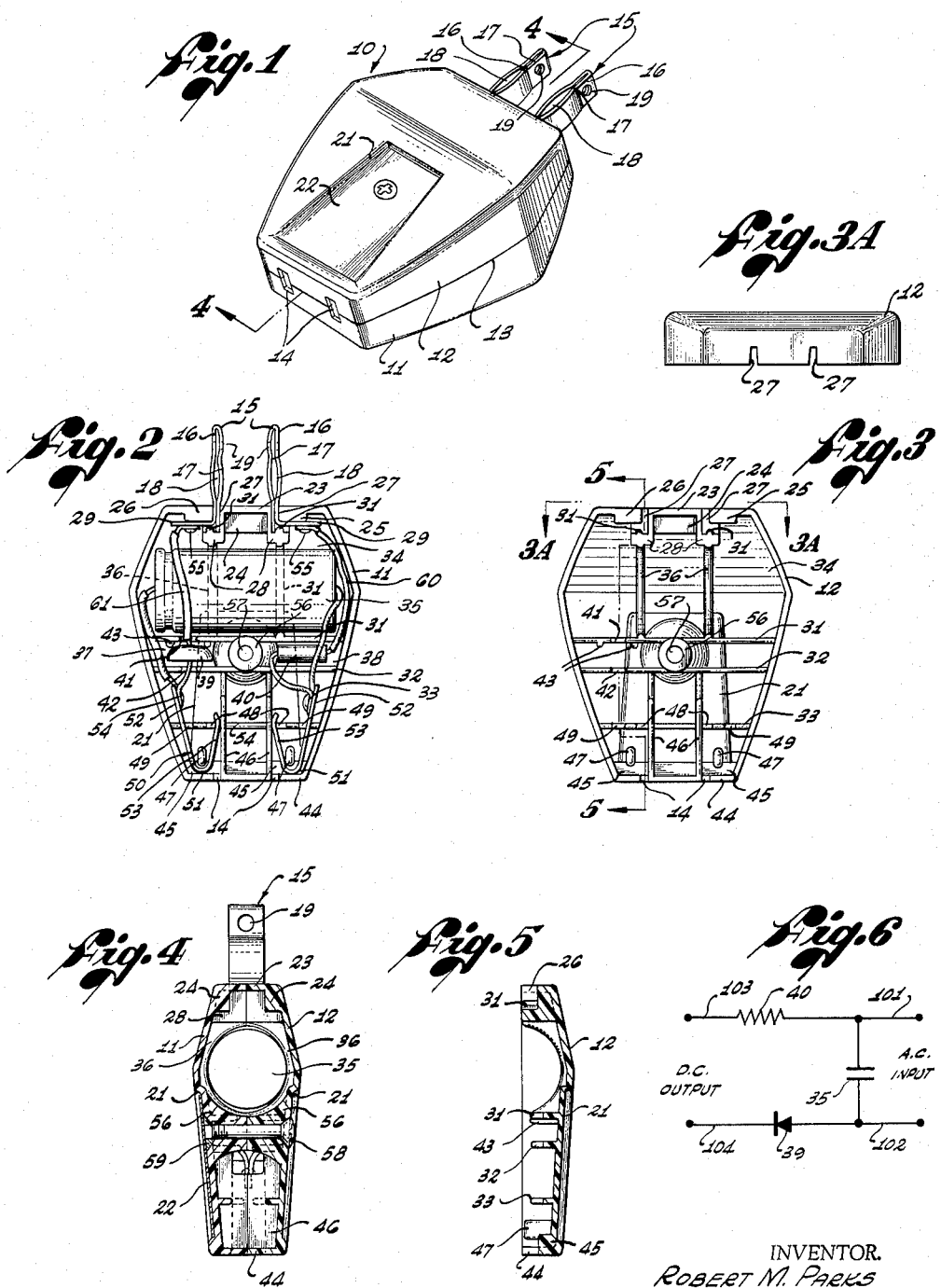

3,255,399
RECTIFIER UNIT
Robert M. Parks, Hollywood, Calif., assignor to Robert M. Parks Co., Inc., Hollywood, Calif., a corporation of California
Filed Mar. 26, 1962, Ser. No. 182,524
5 Claims. (Cl. 321—8)

This invention relates generally to rectifiers, and more particularly to a new and improved rectifier casing structure and cooperating component arrangement wherein the over-all rectifier assembly is characterized by enhanced strength, compactness, operational efficiency and manufacturing economy.

Many electrical appliances, such as electric shavers, hair clippers, or the like, which are rated for alternating current operation, e.g., of the order of 110–120 volts and 50–60 cycles, display significantly improved performance characteristics when operated from a direct current supply of the same or even greater voltages. In motorized devices, such as electric shavers, this improved performance is accomplished because of the conversion from synchronous to non-synchronous motor operation with consequent high speeds and power output.

In view of the fact that present day electrical power is most often available in the form of alternating current, as opposed to direct current electric power, those seeking to exploit the aforedescribed advantages of operating appropriate appliances on direct current must employ an intermediate device to convert the alternating current power to direct current power prior to utilization by the appliance. Hence, there have been provide A.-C. to D.-C. converters or rectifiers in packaged units which are adapted for plugging into A.-C. electrical outlets and which have D.-C. electrical outlets of their own to which any designated appliances may be suitably connected in the conventional manner.

However, many of the aforedescribed rectifier units have had a number of problems which affect their operations and trouble-free use. Among the difficulties encountered with such rectifier units have been the lack of sufficient structural rigidity, the shifting or breaking loose of electronic omponents, and contact members, and/or soldered connections within the unit during use, and the lack of sufficient compactness of such units relative to the appliances with which they are utilized. For example, many commercial rectifier units designed for use with electric shavers very nearly approach the size of the shaver itself, a condition which is most undesirable from the point of view of convenient portability.

Moreover, those concerned with the manufacture of such rectifier units have long recognized the need for a compact unit which can be economically manufactured. Rectifier units heretofore available have commonly embodied casing structure comprising upper and lower halves molded of a suitable material such as plastic. Both of these casing halves are dissimilar and, hence, have generally required formation in separate molds. The latter arrangement significantly increases the complexity and attendant cost of the fabrication process.

A further difficulty encountered with such rectifier units has been the inability to provide compact rectifier units with power output capabilities of sufficient magnitude to satisfy the requirements of a wide variety of appliances. In this regard, for example, electrical hair clippers generally require much greater electrical power for their operation than do conventional electric shavers. Hence, rectifier units which are suitable for A.-C. to D.-C. conversion for electric shavers have not always proven equally successful in their applicability to the operation of other appliances having greater power requirements.

Accordingly, it is an object of the present invention to provide a new and improved rectifier unit which overcomes the above and other disadvantages of the prior art.

Another object is to provide an improved rectifier unit in which the rectifier casing structure is comprised of two complementary halves which are identical, interchangeable, and can be formed from a single mold.

A further object of the invention is a provision of an improved rectifier unit embodying a novel compartment arrangement for the rigid support of all electrical components.

Still another object is to provide a new and improved compartmented rectifier unit which minimizes flexing of soldered connections and provides passages for the conveyance of connecting leads therethrough.

Yet another object is to provide a compact rectifier unit which is extremely strong and possesses minimal tendency for the casing structure to crack under compressive assembly forces.

A still further object of the present invention is the provision of a new and improved rectifier unit in which the support for inlet and outlet contact members is such as to directly restrain these contacts against undesired movement.

Another object is to provide a compact rectifier unit which is economical to manufacture and capable of high electrical output.

The above and other objects of this invention will be better understood by reference to the following detailed description when considered in connection with the accompanying drawings of an illustrative embodiment thereof, wherein:

FIGURE 1 is a perspective view of a rectifier unit in accordance with the present invention;

FIGURE 2 is a plan view of the bottom half of the rectifier unit casing structure and shows the arrangement of electrical components installed therein;

FIGURE 3 is a plan view illustrating the internal structure of the upper half of the rectifier unit casing structure of FIGURE 1;

FIGURE 3A is an elevational detail taken along the line 3A—3A of FIGURE 3;

FIGURE 4 is a sectional view, in elevation, taken substantially along the line 4—4 of FIGURE 1 and illustrates the manner in which the top and bottom halves of the casing structure are joined in a cooperative assembly;

FIGURE 5 is a sectional view, in elevation, taken substantially along the line 5—5 of FIGURE 3; and FIGURE 6 is a schematic depiction of an electrical rectifying circuit for use in the rectifier unit of the present invention.

Referring now to the drawings, and particularly to FIGURE 1 thereof, there is shown an assembled rectifier unit 10. The rectifier unit 10 includes a casing structure having a casing bottom 11 and a casing top 12 which complement each other and mate in a common plane along their edges 13 in the final assembly. The rectifier unit 10 has a pair of male electrical contact members 15 of brass, copper or other electrically conducting material, extending from the rectifier unit casing structure and adapted for insertion into a conventional A.-C. electrical outlet. The rectifier unit 10 also provides, in the assembled state, a pair of outlet female electrical sockets 14 for receipt of cooperating male electrical contact members from an electrical appliance to be operated on the direct current power available at these outlet sockets of the rectifier unit.

The casing structure of the rectifier unit 10 may be fabricated of any electrically insulating material which can be molded, such as plastic or the like. Moreover, the external configuration of the rectifier casing structure, here shown to be polygonal in shape, may assume any compact configuration which is compatible with the internal compartment arrangement of the rectifier unit 10. The top and bottom casing halves 11, 12 may be also provided with suitable recesses, such as the recess 21 shown molded into the casing top 12 in FIGURE 1, for subsequent receipt of a nameplate, instruction plate, or the like, such as 22. The recesses, such as 21, also impart additional structural rigidity of the over-all casing structure.

As will be apparent from FIGURES 2 and 3, the complementary casing structure halves 11, 12 are of identical internal and external configuration and thereby interchangeable with one another. Moreover, all of the structural elements of each casing structure half, e.g., ribs, baffles, shoulders, etc., are integral therewith. In this regard, the casing bottom 11 and casing top 12 may be formed from the same mold. The latter results in a considerable economy from the fabrication standpoint and also reduces the required time and cost of assembly since the casing structure halves need not be sorted and labeled, or otherwise distinguished, for proper orientation in the subsequent assembly process.

FIGURE 2 of the drawings illustrates the casing bottom 11 with all of the rectifier unit electrical components installed, whereas FIGURE 3 depicts the casing top 12, identical in all respects to the structure of the casing bottom 11, but prior to the installation of any components in the manner shown in FIGURE 2. Hence, FIGURE 5 is equally applicable to depicting the internal structure of the casing bottom 11 of FIGURE 2 or the casing top 12 of FIGURE 3.

The casing bottom 11 is provided with a forward end wall 23 having a central thickened portion 24 flanked by two additional thickened wall portions 25, 26 on either side. The purpose of the thickened wall portions 24, 25, 26 is to reinforce the forward wall 23 of the casing structure in the region where the male electrical contact members 15 extend through the wall.

The male electrical contact members 15 each comprise a prong having a pair of confronting leg portions 16, 17 which are bowed at 18 to impart spring action to the contact and, hence, improve contact fit upon subsequent insertion into an appropriate electrical outlet. The electrical contacts 15 are also provided with openings 19 extending through both legs of each contact, and which are adapted to engage the contact lugs of conventional electrical outlets.

The thickened wall portions 25, 26 of the forward wall 23 are provided with a pair of notches 27, disposed symmetrically about the longitudinal axis of the casing structure, which are spaced apart a distance equal to the desired spacing between the male electrical contacts 14. The notches 27 extend to a pair of upright shoulders 28 behind the thickened wall portions 25, 26 of the forward wall 23. The width of each of the shoulders 28 is greater than the width of each of the notches 27. As is seen in FIGURE 3A, the side walls of the notches 27 converge inwardly towards their bottom and thus insure a tight fit with the legs 16 and 17 of the contacts 15 to prevent any spreading thereof.

The prongs of the male electrical contacts 15 are inserted within the notches 27 and are restrained against inward longitudinal movement within the notches by way of the buttressing action of the shoulders 28 against the legs 17. The legs 16 of the electrical contacts 15 are each provided with a single laterally turned ear portion 29 which engages the rear surfaces of the thickened wall portions 25, 26 respectively, to prevent lateral shifting of the contacts outwardly of the casing bottom 11 subsequent to their installation. The electrical contacts 15 are also restrained against inward lateral movement in the casing structure by opposite confronting wall surfaces of each of the notches 27.

Further lateral and longitudinal restraining action for the electrical contacts 15 is accomplished by a pair of nibs 31, one for each of the shoulders 28. The nibs 31 are integral with the shoulders 28 and vertically extend the depth of the grooves 27 (see FIGURE 5). The nibs 31 protrude from the forward surfaces of the shoulders 28 and are oriented to restrain the contact legs 17 against lateral movement and the laterally turned ears 29 against longitudinal movement.

Behind the shoulders 28, a plurality of upright baffle members 31, 32, 33 (see FIGURE 5) extend laterally the full width of the casing bottom 11 to divide the casing bottom into a plurality of compartments for receiving and confining the electrical components of the rectifier unit. The space between the baffle member 31 and the shoulders 28 forms a compartment 34 in which there is shown mounted a tubular capacitor 35. As best observed in FIGURES 2 and 4, a pair of semicircular laterally spaced ribs 36 extend from the rear faces of the shoulders 28, along the bottom wall of the casing bottom 11, to the baffle 35. The contour of the ribs 36 is such as to mate with the peripheral configuration of the capacitor 35. Hence, when the casing top 12 of FIGURE 3 is properly assembled with the casing bottom 11 of FIGURE 3, the matching ribs 36 of the casing top also engage the capacitor 35, substantially as shown in FIGURE 4, to firmly grip and rigidly support the capacitor.

The longitudinal spacing between the parallel baffles 31 and 32 is such as to provide a pair of compartments 37, 38 for additional electrical components. A miniature semiconductor rectifying element, such as a silicon or germanium diode or the like, is shown within the compartment 37, whereas a resistor 40 is housed within the compartment 38 of the casing bottom 11.

The baffle members 31, 32 are each provided with notches 41, 42, respectively, to provide clearance for the leads of the component 39 in the compartment 37. In this regard, the corresponding notches 41, 42 in the casing top 12 of FIGURE 3 will align themselves, during assembly, with the leads in the region of the compartment 38 in FIGURE 2. If necessary or desired, sleeves of insulation, such as 60, 61, 62 on the rectifier and capacitor leads may be utilized to minimize the possibility of hte various component and connecting leads from short-circuiting.

Integral vertical ridges 43 extend from the surface of the baffle member 31 on either side of the notch 41 into the compartment 37. These ridges 43 limit the movement of the diode 39 within the compartment 37. Furthermore, the corresponding ridges 43 in the casing top 12 will similarly restrain the resistor 40 within the compartment 38 of the casing bottom 11, upon subsequent assembly of the casing structure halves 11, 12 together.

The rear end wall 44 of the casing structure is provided with a thickened wall portion 45, best seen in FIGURE 5, adjacent each of the socket grooves in the casing bottom 11. These socket grooves 14 combine with the corresponding grooves 14 in the casing top 12 to form the female electrical sockets shown in FIGURE 1. Extending longitudinally in the forward direction from the rear end wall 44 are a pair of parallel upright partition walls 46 which are spaced laterally about the center line of the casing structure to bring them into alignment with the inner wall surfaces forming the grooves 14. Spaced forward of the rear wall 44, but behind the baffle member 33, are a pair of integrally molded upright posts 47 which are also spaced outwardly in the lateral direction from the socket grooves 14.

The baffle member 33 is provided with a pair of slots 48 adjacent the outermost lateral surface of each of the partition walls 46. The baffle member 33 is also provided with a second pair of notches or slots 49 which are spaced outwardly in the lateral direction from the slots 48.

A pair of outlet contact members 50, of any suitable electrically conducting material, are installed in the casing bottom 11. Each of the contact members 50 is in the form of a V-like element having an apex 51 and a pair of legs 52, 53, respectively. The apex 51 of each contact member 50 is supported between one of the posts 47 and the rear wall 44 of the casing structure. In this manner, the contact members 50 are restrained against longitudinal movement in either direction.

The contact members 14 are also resilient, and the legs 53 of the contact members engage the slots 48 in the baffle member 33 and thereby abut the partition walls 46. The legs 52 of the contact members 50 abut the outer lateral walls forming the slot 49 in the baffle member 33. Hence, the legs 52 are restrained against outward lateral movement while the legs 53 of the contact members 50 are restrained against inward lateral movement by the partition walls 46.

However, insertion of a pair of male contact members from a suitable appliance through the socket grooves 14, between the partition walls 46 and the legs 53 of the contact members 50, will cause the contact legs 53 to resiliently yield in the outward lateral direction. In this manner, the legs 53 of the contact member 50 exert spring forces against inserted male contact members which tend to hold such male contact members against the partition walls 46.

The electrical leads from the components 35, 39, 40 housed within the casing structure are suitably connected at 54 to the legs 52 of the contact members 50. In a similar manner, electrical connections are made at 55 of the laterally turned ears 29 of the male contact members 15. All such electrical connections may be made by any well known method, such as soldering or the like. In the preferred embodiment, both the legs 52 and ears 29 are formed with stamped eyelets 52a and 29a, respectively, which threadedly receive the ends of the electrical leads to insure an even more positive mechanical connection.

The casing top 12 shown in FIGURE 3 is, as previously indicated, identical in all structural respects to the casing bottom 11 of FIGURE 2 and, accordingly, the corresponding parts have been similarly labeled. Both of the casing structure halves 11, 12 are provided with a central enlargement 56 having a central aperture 57 extending therethrough. For additional strength at this point in the casing structure, the walls of the enlargement 56 are thickened and fillet into the casing walls to provide maximum rigidity adjacent the casing wall.

As will be apparent from FIGURE 4, the casing structure halves 11, 12 are held together by passing an assembly bolt or screw 58 through the aperture 57 of the reinforced central enlargement 56 in both casing halves. The threads of the screw 58 are engaged by an appropriate nut 59 on the opposite side of the casing structure than that through which the screw enters.

By virtue of the filleted reinforcement of the central enlargement 56 in each of the casing structure halves 11, 12, the tendency of the casing structure to crack due to the compressive forces applied by the screw 58 and nut 59 is considerably reduced. Moreover, electrical components mounted within the casing structure, as shown in FIGURE 2, and held substantially in the assembled state as shown in FIGURE 4, display a minimal tendency to shift or flex during use of the rectifier unit. In this manner, tendency for flexing and consequent breaking loose of soldered connections due to forces exerted on the component leads is minimized.

A preferred embodiment of an electrical circuit arrangement for interconnecting the electrical components 35, 39, 40 into a rectifying network is schematically depicted in FIGURE 6. In this arrangement, the capacitor 35 is shunted across the A.-C. input lines 101, 102. The D.-C. output lines 103, 104 contain the diode 39 in series with the resistor 40. In operation, the capacitor 35 charges to the peak value of the A.-C. input voltage during each half cycle of the input. Alternate half cycles of this peak voltage are transmitted by the diode 39. The time constant of the capacitor discharge to the D.-C. output load is partially controlled by the magnitude of the resistor 40 which also simultaneously serves the purpose of a current limiting resistor. Because of the present day availability of miniaturized electronic components having increased electrical operating parameter ratings, the electrical components stored within the various compartments of the casing structure shown in FIGURES 2–5 are extremely small and yet are capable of providing sufficient D.-C. output electrical power in the arrangement of FIGURE 6 to satisfy the electrical requirements, heretofore unsatisfied, of larger appliances.

The new and improved rectifier units of the present invention satisfy a long-existing need in the electrical arts for a compact and economically manufactured A.-C. to D.-C. power converter displaying superior operational performance characteristics.

It will be apparent from the foregoing that, while a particular form of my invention has been illustrated and described, various modifications can be made without departing from the spirit and scope of my invention. Accordingly, I do not intend that my invention be limited, except as by the appended claims.

I claim:

1. In a rectifier unit including a casing structure having forward and rear end walls and embodying two mating structurally identical casing halves, an arrangement comprising: a first pair of laterally spaced notches in said forward end wall; a pair of upright shoulders longitudinally spaced from said forward wall and positioned directly behind each of said notches, the lateral width of each of said shoulders being greater than the width of each of said notches; a nib extending from each of said shoulders and confronting said forward wall, each of said nibs being in substantial alignment with a portion of one of said notches, each of said nibs extending toward said forward wall a distance less than the longitudinal spacing between said shoulders and said forward wall; a pair of male electrical contacts extending through said pair of notches in said forward wall, each of said male electrical contacts having a pair of legs, the shorter of said legs abutting one of said shoulders and said nibs, the longer of said legs having a single laterally turned ear abutting the rear surface of said forward wall and being closely adjacent the nib only of one of said shoulders, so that said nib effectively restrains said laterally turned ear against substantial longitudinal motion; a second pair of laterally spaced notches located in said rear end wall; a baffle member extending laterally across said casing structure and parallel to said rear wall; a pair of partition walls adjacent said notches and extending from said rear wall perpendicular to said baffle member; a first pair of slots in said baffle member, each of said slots being adjacent one of said partition walls; a second pair of slots in said baffle member each of said second pair of slots being spaced laterally outward along said baffle member from said first pair of slots; a pair of upright posts within said casing structure between said baffle member and said rear wall, each of said posts being laterally spaced outwardly from one of said partition walls a distance greater than the width of each of said second pair of notches; a pair of V-shaped electrical contact members, each of said contact members having its apex confronting said rear wall and positioned between one of said upright posts and said rear wall, each of said contact members also including a pair of resilient legs, one of said legs engaging one of said first pair of slots in said baffle member and abutting one of said partition walls, the other of said legs engaging one of said second pair of slots in said baffle member; and electrical circuit means within said casing structure for interconnecting said male electrical contacts with said V-shaped electrical contact members.

2. A rectifier unit as set forth in claim 1 wherein said casing halves include integral means forming a plurality of compartments and passageways for housing and rigidly supporting said electrical circuit means.

3. An arrangement as set forth in claim 2 wherein said electrical circuit means includes a capacitor, a miniature diode, and a resistance, all of said components being interconnected in a rectifying network, whereby A.-C. electrical power applied to said male electrical contacts will be converted to D.-C. electrical power available at said V-shaped electrical contact members.

4. The rectifier unit of claim 1 including thickened forward and rear end wall portions adjacent said first and said second pair of laterally spaced notches; and a central enlargement in said casing structure integral with said casing halves and having a central aperture therethrough for the passage of an assembly screw, said central enlargement having thickened wall portions to reinforce said casing structure against compressive assembly forces.

5. The electrical contact member of claim 4 wherein at least one of said legs also includes a resilient bowed portion along its length.

References Cited by the Examiner
UNITED STATES PATENTS

| | | | |
|---|---|---|---|
| 2,475,184 | 7/1949 | Hudson | 174—92 |
| 2,491,031 | 12/1949 | Burgess | 321—8 |
| 2,505,518 | 4/1950 | Benander | 339—208 X |
| 2,530,302 | 11/1950 | Jepson | 310—50 |
| 2,930,858 | 3/1960 | Hollingsworth | 174—52 |

LLOYD McCOLLUM, *Primary Examiner.*

MAX L. LEVY, *Examiner.*

J. C. SQUILLARO, G. J. BUDOCK,
*Assistant Examiners.*